July 13, 1943.  E. M. SORENSEN  2,324,331
REMOTE CONTROL APPARATUS
Filed Dec. 20, 1940  2 Sheets-Sheet 1
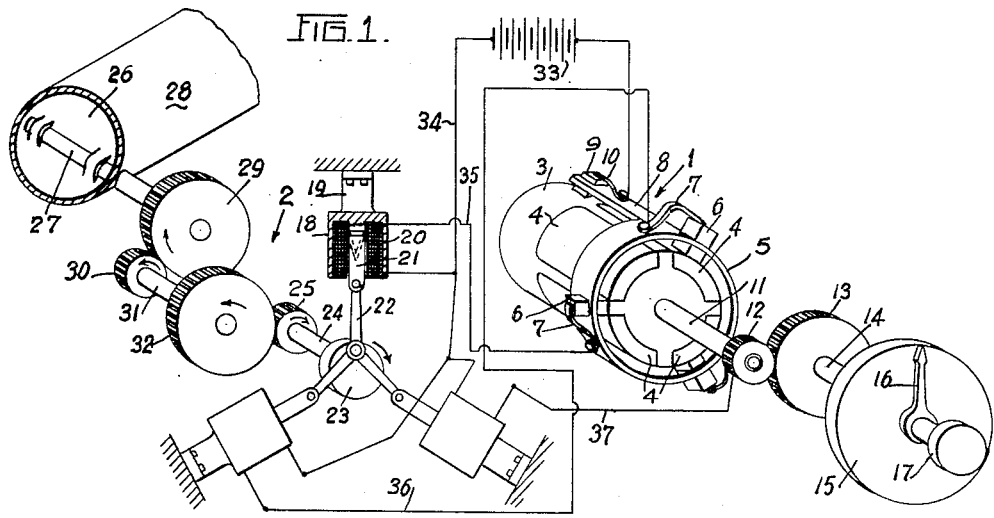
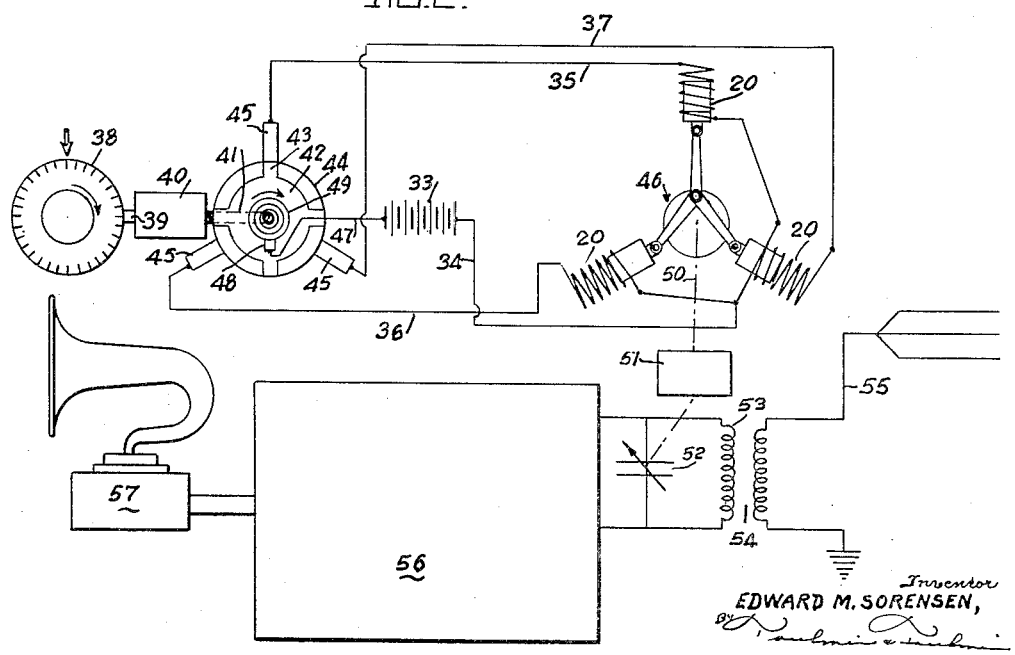
Inventor
EDWARD M. SORENSEN,
Attorneys July 13, 1943.  E. M. SORENSEN  2,324,331
REMOTE CONTROL APPARATUS
Filed Dec. 20, 1940  2 Sheets-Sheet 2
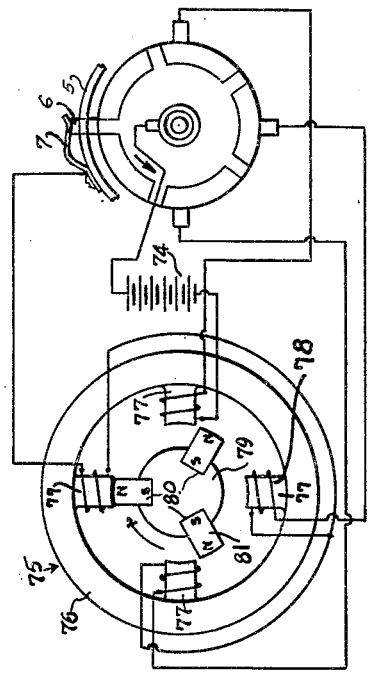

Patented July 13, 1943

2,324,331

UNITED STATES PATENT OFFICE 2,324,331

REMOTE CONTROL APPARATUS

Edward M. Sorensen, Dayton, Ohio, assignor to The Soren Corporation, Dayton, Ohio, a corporation of Delaware Application December 20, 1940, Serial No. 370,986

1 Claim. (Cl. 172—239)

The present invention relates to remote control systems, and more especially to torque amplifiers in which relatively small rotary efforts applied to relatively small masses are utilized to cause movements of relatively large masses at any desired rate of movement as a function of the speed of the initial rotary effort.

The invention also relates to the art of remote control, in which the controlled devices are positioned at a considerable distance from the controlling apparatus, and the space which is allotted to the controlling and controlled devices and their associated apparatus is limited.

There is a large number of cases in the art of torque amplifiers in which the initiating force is removed from the controlled device. In many of these cases the initiating force is relatively small, usually applied by hand, as compared with the force necessary to operate the controlled device, as for example, when it is desired to swing a heavy ventilator door of an air conditioning unit, or the rudder of a large airplane, or when a heavy loop antenna is to be orientated by the manual movement of a control lever, indicator or dial. Some of these torque transmitters rely entirely on mechanical connections, and employ a complicated and bulky system of levers and cables to obtain mechanical advantage. Other types of systems employ an electrical connection between the controlling and the controlled apparatus, but necessitate expensive accessories such as Selsyn motors, etc. and relays of a highly sensitive character, which are not only difficult to adjust but are not highly dependable.

The primary object of the invention is to provide a remote control system in which the controlling and controlled devices are of a simple, inexpensive character, compact in form in requiring the minimum number of accessories, and easy to install and operate.

Another object is to provide a torque amplifier which is operated electrically and therefore lends itself to long distances between the controlling and controlled devices, and in which a relatively small rotary effort at the controlling device can cause the movement of a relatively large mass at the distant station.

Still another object is to provide a remote control system in which the controlled device may be moved or rotated at any desired rate of speed as a function of the rotary effort applied to the controlling device.

The invention will be better understood when the specification is perused in connection with the accompanying drawings.

In the drawings:

Figure 1 is a perspective view, partly in diagram, of the improved remote control system as applied to the regulation of the position of a ventilating damper.

Figure 2 illustrates the use of the improved torque amplifier or device in connection with the remote tuning control of a radio receiving set.

Figure 3 is a diagrammatic view of the remote control system with the actuating device at one station or position shown in plan, and the actuating element at the other station or position shown in perspective.

Figure 4 illustrates a modification of the devices shown in the preceding figures.

Figure 5 is a schematic view of the different positions assumed by the rotating parts at the controlling and controlled stations during a complete operating cycle, and considered from the standpoint of operating in both directions.

Referring more particularly to Figure 1, reference numeral 1 designates generally the controlling apparatus shown in the form of a rotatable switch, and reference numeral 2 generally designates the controlled apparatus illustrated in the form of a three-piston electromagnetic motor. The controlling and controlled devices are connected together electrically through conductors which may have any desired length, and which may contain a wired or radio link.

In general, the rotary switch at the controlling station or position is constituted of four commutator bars or terminals which are adapted to be rotated within a surrounding structure containing three brushes, and contact is made between the bars and the brushes as the commutator is rotated in any suitable and predetermined manner. While the commutator may be made in a number of various ways, I prefer to employ a cylinder 3 of solid metal, such as brass, in which peripheral grooves have been cut or molded, and these grooves are filled in any suitable manner by an insulating material, for example, Bakelite 4. The Bakelite is conveniently molded, and as shown in the figure, may extend along the length of the metal cylinder 3 only for a limited distance. After the moldable material has been solidified, the cylinder 3 may be turned down to cause the outer surface of the Bakelite portions to conform to the cylindrical contour of the member 3. The end view of the turned-down cylinder will show a cross-like formation of brass, or other metal, the projecting portions having interposed therebetween a segment of Bakelite. The entire cylinder 3 will not be entirely unlike a commutator of a direct current motor in which the projecting metal portions between the insulating segments can be considered as commutator bars. In Figure 1, I have shown the commutator as having four bars equi-distantly spaced from one another, but as pointed out hereinafter, this element may have a greater or smaller number of bars, depending on the uses to which the switch is put.

There is a relatively thin ring 5 of insulating material which surrounds the cylinder 3 and is spaced therefrom in any suitable manner. This ring is provided with three openings, equi-distantly spaced about its periphery and preferably of a rectangular configuration to receive carbon brushes 6. These brushes extend through the openings and bear at their inner ends against the commutator 3, being urged radially inward by the springs 7 which are secured to ring 5. There is an extension 8 of insulating material secured to the ring 5 in any suitable manner, this extension having an opening at its far end to receive a brush 9. The latter is forced downwardly to bear against the continuous metal portion of the commutator 3 by a spring 10 which is secured to the extension 8. The rotary portion 3 of the switch is provided with a shaft 11 which extends outwardly from the front surface and terminates in a gear 12. The latter meshes with a gear 13 which is carried on a shaft 14. The shaft 14 is journalled in a support member 15, shown as a circular disc, and contacting with the front face of the disc there is an index pointer 16 secured to the shaft and rotatable by a knob 17. It is apparent that as the knob is turned the pointer 16 will move, and the rotary effort is communicated through the gears 13, 12 to the rotary cylinder 3, and will cause the metal projections at the front end of the cylinder to make and break contact with the brushes 6 as the switch is rotated.

The controlled device, which is normally situated at a different position from the controlling device, is represented in Figure 1 as taking the form of a multi-cylinder electromagnetic motor. There are as many stationary cylinders 18 as brushes 6, and they are equi-distantly spaced as in the case of the brushes. The cylinders may be carried on brackets 19 and secured to a supporting framework. Each of these cylinders contains a solenoid 20, of annular configuration, with a central opening in which is positioned an armature plunger 21. The arrangement is such that the plunger is adapted to be drawn into the coil when the latter is energized, as will be explained presently. Each plunger is pivotally connected through a bar 22 to a crank 23 shown in the form of a metal plate. This plate is carried on a shaft 24 which terminates in a gear 25. The latter may be geared to any rotatable member which it is desired to actuate when the electromagnetic motor is energized. As exemplified, the load is constituted of a damper plate 26 secured to a shaft 27, and the latter is journalled in a pipe 28 which may constitute part of a ventilating system. A gear 29 is mounted on the shaft and is rotated by a pinion 30, the latter being carried on the shaft 31 which terminates in a gear 32 driven by the pinion 25.

For energizing the system there may be employed a source of direct current energy indicated at 33, one end of which is connected through a conductor 34 to the inner ends of all of the solenoids 20. The other terminal of the electromotive force is connected to the spring 10 of the controlling apparatus, and thus effectively to the metal portion of the cylinder 3 through the brush 9. The outer or upper end of the uppermost solenoid 20 is connected through a conductor 35 to the lower left-hand brush 6. The outer or lower end of the left-hand solenoid 20 is connected through a conductor 36 to the uppermost brush 6, while the outer end of the right-hand solenoid 20 is connected through a conductor 37 to the lowermost brush 6.

It is apparent that as the pointer 16 is turned by the knob 17, causing the metal extensions or commutator bars of the rotary switch to rotate, the circuit passing through the common battery 33 is intermittently made and broken and the solenoids in the respective cylinders 18 are intermittently energized in a sequence determined by the direction of rotation of the commutator 3. In the particular position of the commutator shown in Figure 1, the left-hand bar is making contact with the left-hand brush, and a tracing of the circuits will show that the upper solenoid 20 is energized. As the plunger 21 moves upwardly into the solenoid the crank 23 will be caused to rotate, thus turning the damper 26 through the gear mechanism. It will be shown in connection with Figure 5 that for other positions of the pointer 16 the remaining solenoids 20 are energized in predetermined sequence, thus controlling the direction and amount of rotation of the damper.

In Figure 5, I have shown the sequence of operation of the controlling and controlled devices for both directions of rotation. The first row of illustrations in this figure, beginning with the diagram at the middle of the row and extending toward the left, depicts the rotary movement of a typical form of motor in the counter-clockwise direction, while the illustrations to the right of the middle diagram in the first row show the movements of the motor in the clockwise direction. The middle diagram depicts the condition when the motor is at rest, or in neutral position. The second row of diagrams in Figure 5 indicates the relative positions of the brushes and commutator bars for the particular position of the motor shown directly above each diagram. The last row of diagrams illustrates in schematic form the relative positions of the plungers of the form of motor shown in Figure 1 for the particular position of the brushes and commutator bars shown in the diagram immediately above. It will be noted that the first row of diagrams in Figure 5 represents a different type of motor than the last row, in that the first row depicts a motor having a magnetic rotor which will be explained in connection with Figures 3 and 4, whereas the last row depicts a motor of the electromagnet-plunger type shown in Figures 1 and 2. Referring to the second horizontal row of diagrams in Figure 5, it will be noted that as in the case of Figure 1, there are four commutator bars $d$, $e$, $f$ and $g$, equi-distantly spaced around a cylinder and connected together as indicated by the wires $h$. There are also three brushes $a$, $b$ and $c$ equi-distantly spaced around the ring 5 (Figure 1).

Beginning with the vertical middle row in Figure 5, it will be noted that the commutator is momentarily in such a position that the bar or segment $d$ is directly adjacent the brush $a$ and therefore makes contact therewith. This is the same condition as shown in Figure 1, in which the left-hand commutator bar makes contact with the left-hand brush. Under these circumstances the solenoid, diagrammatically indicated at *i* (last horizontal row of Figure 5), is energized and the crank is in the position shown. A motor having a magnetic rotor form of armature, shown in the first horizontal row of Figure 5, will be discussed after Figures 3 and 4 are considered.

Now assume that the commutator has been moved counter-clockwise through 30°, as indicated in the diagram directly to the left of the middle diagram in the second horizontal row of Figure 5. Under these circumstances the bar *g* will contact with the brush *c*, causing energization of the electromagnet *j* and turning the crank through 120°. Further movement of the commutator through an additional 30° will cause the bar *f* to contact with the brush *b*, and this in turn will cause energization of the electromagnet *k*, thus rotating the crank through 120°. Finally, as the commutator is moved through an additional 30° the bar *e* will have contacted the brush *a*, thus again energizing the electromagnet *i* and moving the crank to the same position as it had at the start of the operation. Consequently the crank is rotated through a complete turn as the commutator is moved through 90° so that the crank rotates four times as fast as the commutator. The sequence of rotation of the commutator and corresponding movement of the crank described immediately above have been illustrated in the second and third horizontal rows of diagrams in Figure 5, to the left of the middle vertical row. A similar relation exists between a clockwise rotation of the commutator and a corresponding clockwise rotation of the crank as is depicted in the second and third horizontal rows of diagrams of Figure 5 to the right of the middle vertical row. However, it will be noted that the electromagnets *i*, *j* and *k* are merely operated in a different sequence when the commutator is rotated clockwise than in the case of a counter-clockwise rotation of the commutator.

It is therefore apparent that a movement of the pointer 16 (Figure 1) through 90° would cause the crank 23 to rotate through a full turn, and this angular motion may be either increased or decreased as desired at the damper 26 by a suitable form of gearing. It will also be apparent that the relative motion between the commutator at the controlling device and the crank at the controlled device is dependent upon the precessional effects brought about at the commutator by the difference in the angle between two adjacent brushes and the angle between two adjacent commutator bars. This will be considered further in connection with Figure 3, in which a greater number of bars and brushes is employed than in the case of Figure 1.

In Figure 2, I have shown the application of my invention to the remote tuning of a radio receiving set. The tuning dial is indicated at 38, and the shaft of the dial may carry a suitable form of gear for rotating a shaft 39. The latter shaft may pass through a step-up motion formed of gearing indicated by the rectangle 40, from which an output shaft 41 emerges. The latter is geared or otherwise connected to a rotatable commutator 42 having four metal extensions or bars 43, equi-distantly spaced about the commutator. A ring, indicated at 44, surrounds the commutator and carries three equi-distantly spaced brushes 45, the arrangement being such that as the dial 38 is rotated the commutator 42 is rotated at a fast rate due to the gearing 40, and makes and breaks contact between the bars 43 and the brushes 45 in a predetermined sequence.

At the remote station there is provided an electromagnetic motor, generally indicated at 46, similar to that described in connection with Figure 1, i. e. of the solenoid type with reciprocating magnetic plungers connected to a crank. A battery or other source of current is indicated at 33, as in the case of Figure 1, and a connection is made from one side of the battery, through a conductor 47, to a brush 48 which bears against a slip ring 49 carried by the commutator 42. The other side of the battery 33 is connected by a conductor 34 to the inner taps of the electromagnets, and the outer taps of the latter are connected through conductors 35, 36 and 37 to their respective brushes, as in the case of Figure 1. The crank of the motor 46 is connected through a shaft 50 to a step-down gearing mechanism, indicated at the rectangle 51. This gearing is mechanically connected to a variable tuning condenser 52 which is electrically connected across the secondary 53 of a tuning transformer 54 of a radio receiving circuit, indicated at 55. The output of the condenser 52 passes into a radio receiving set 56 of any suitable and well known type having a loud speaker accessory 57.

It is evident that as the dial 38 is moved, causing a rapid rotation of the commutator 42 due to the step-up gearing 40, the circuit between the brushes 45 and the commutator bars is rapidly made and broken in a predetermined sequence, depending on the direction and speed of rotation of the dial, causing the solenoids 20 to actuate the plungers in a predetermined sequence and to change the tuning of the radio receiving set at the condenser 52. Obviously the dial 38 may be positioned at a long distance from the receiving set. It is apparent that on account of the speeding-up effect introduced at the gears 40, the rate at which the circuit is made and broken at the respective brushes is thereby increased and the electromagnetic motor 46 is rotated at a correspondingly fast rate. The rest periods between the thrust exerted by the solenoids is materially reduced so that the overall effect is to provide a smooth continuous operation at the gearing 51, with consequent smooth manipulation of the condenser 52. This increased smoothness of operation can also be obtained by increasing the number of the solenoids or electromagnets 20 and increasing in corresponding degree the number of brushes and commutator bars. Such an apparatus has been shown in Figure 3, but utilizing a different form of electromagnetic motor than in the case of Figures 1 and 2.

In Figure 3 the commutator is given four bars or segments, indicated at 58, equi-distantly spaced and which cooperate with five brushes 59 carried by a ring 60. At the remote station the motor may take the form of a U-shaped permanent magnet 61 having pole pieces 62 and 63, respectively. An electromagnetic rotor, generally indicated 64, is adapted to rotate between the pole pieces. The rotor consists essentially of a shaft 65 which carries at the end facing the observer a sleeve 66 of insulating material contained within a metal ring 67. Extending radially outward from the ring there is a plurality (five as illustrated) of rod-like cores 68 for the surrounding solenoids 69. The inner ends of these solenoids are connected together at the metal ring 67, and the outer ends of the solenoids are connected to slip rings 70 mounted on but insulated from the shaft 65. There are individual brushes 71 associated with the slip rings, and conductors 72 are taken from these brushes to the respective brushes 59 at the rotary switch. A source of current 73 is connected between the commutator of the rotary switch and the metal ring 67.

In operation, let us assume that the pole piece 62 is the north pole and the pole piece 63 is the south pole. When the left-hand commutator bar 58 is in contact with the left-hand brush 59, as shown in Figure 3, the solenoid 69 surrounding the left-hand core 68 is energized in such a way as to make its outer end a south pole and its inner end a north pole. Under these circumstances the pole piece 62 will attract the solenoid core and will have the position shown in Figure 3. However, as the commutator at the rotary switch is rotated clockwise through 18°, the circuit through the left-hand solenoid 69 is broken, but a circuit is established through the adjacent solenoid immediately below, causing the rotor 64 to turn clockwise through 72° until the second core is in line with the pole piece 62. Further movement of the commutator through 18° will cause the right-hand segment to contact its brush directly below the segment, in turn causing further rotation of the rotor 64 through an additional 72°. It is apparent that for every 18° movement of the commutator the rotor will have turned through 72°, so that the rotor rotates four times as fast as the commutator.

The first horizontal row of diagrams shown in Figure 5 depicts the operation of a motor having an electromagnetic core or rotor. In Figure 5 the rotor is assumed to have only three cores or pole pieces when the commutator has four segments associated with three brushes, but the operation is the same as in the case of Figure 3 notwithstanding the difference in the number of rotating pole pieces, except for the difference in the rate of rotation. By comparing the first two horizontal rows of Figure 5 it will be apparent that a counter-clockwise movement of the commutator will cause one of the rotating pole pieces or cores to align itself with the stationary pole pieces, and then the next rotating pole piece to align itself with the same stationary pole piece, thus causing a rotation of the electromagnetic rotor. If the commutator is moved in the opposite direction the rotor will likewise rotate in a different direction. It will be further noted in Figure 3 that by reason of the increased number of segments and associated brushes the number of impulses applied to the motor is increased in corresponding degree, thus tending to give smoother operation at the motor than in the case where the commutator has only four bars associated with three brushes. It is apparent that even greater smoothness of operation may be effected by employing a still greater number of commutator bars and a correspondingly greater number of brushes.

Figure 4 shows still another form of motor, but in this case the electromagnets which are intermittently energized by the rotary switch are stationary, and the permanent magnet which cooperates with the electromagnets forms the rotor. The rotary switch includes a stationary member having four brushes, while the rotor is provided with five commutator bars or terminals. The difference in the angle between two adjacent brushes and the angle between two adjacent bars or terminals is 90°−72°=18°. Consequently, for each 18° movement of the rotor an impulse from the battery 74 will be transmitted to the motor, which has been generally designated 75. The latter comprises a ring form of magnetic circuit 76, from which projects radially inward a plurality (illustrated as four) of pole pieces 77, equidistantly spaced. There is a winding 78 on each pole piece, the common inner end of each winding being connected to the battery 74 and the outer end being connected respectively to the brushes of the rotary switch. The rotor 79 is preferably formed of a circular member, from which project radially outward three permanent magnets 80 in case there are four pole pieces 77. It will be understood in this connection that in order to obtain a precessional effect between the rotor and the stationary field it is necessary that these elements have a different number of pole pieces. It will also be evident that the outer surfaces of the pole pieces 81 shall have the same magnetic polarity, for example, a north pole as indicated, so as to cooperate with the inner ends of the pole pieces 77 which are successively caused to become south poles.

A consideration of the figure will show that as the commutator at the rotary switch is moved counter-clockwise through 18°, an impulse having a steep wave front is transmitted to the left-hand pole piece of the motor, which will cause the pole piece of the rotor nearest the left-hand stator pole piece to be attracted into alignment. Thus the rotor rotates clockwise. Further movement of the rotary switch counter-clockwise will first energize the lowermost coil 78 and then the right-hand coil in succession, causing the rotor to rotate through an additional angle. The difference in angle between two adjacent pole pieces 77 on the stator and the angle between two adjacent pole pieces 81 on the rotor is 120°−90°= 30°. Consequently, for each contact made at the rotary switch necessitating an 18° movement, the rotor will have moved through 30° in the opposite direction. The rotor therefore rotates at a speed 30/18 times the rotation of the commutator at the rotary switch. It is apparent that this ratio of speed is dependent on the relative number of pole pieces both in the stator and the rotor of the motor; also dependent on the difference in the number of brushes and commutator bars at the rotary switch, so that if desired a combination of these elements may be provided which will cause the rotor to turn at a synchronous speed with respect to the rotation of the rotary switch. As in the case of the figures previously discussed, the rotor 79 may be mechanically connected to any moveable device, the movements of which are controlled by the rotation of the commutator at the rotary switch.

From the foregoing it is apparent that I have disclosed a torque amplifying apparatus, in which only a relatively small rotary effort is necessary at the rotary switch to cause the rotation of a motor at a separate station which may be distantly positioned from the rotary switch. The rotary element of the switch may have a quite small mass, necessitating only a minute rotary effort, whereas the motor which it effectively controls may have a relatively large and heavy mass, thus being able to accomplish heavy work, although it will be understood that if desired the distant motor may be quite small, particularly in the case where it is employed solely for remote control purposes. The impulses which are transmitted over the wires interconnecting the motor and the rotary switch have a steep wave front, but are nevertheless efficiently received and translated magnetically at the distant motor into a rotary effort. These interconnecting wires are relatively few in number, necessitating only one more wire than there are brushes, so that in the case of a three-brush switch, shown for example in Figures 1 and 2, only four wires need be taken to the remotely positioned motor.

While I have described the operation of my improved remote control apparatus as employing direct current, it will be understood that if desired the source of the impulse energy may be alternating current having a frequency greater than the frequency of the impulses, when suitable and well known changes are made in the electromagnetic circuit portion of the motor to cause a steady pull at the solenoid when a group of alternating current impulses is transmitted thereto from the switch. It will be further understood that the remote control system is not limited to the application shown in Figures 1 and 2, but may be employed in any place where control of apparatus is to be exercised from a distant or separate transmitting or controlling station. For example, the invention has particular application in the case of airplanes for operating aerolons, elevator fins or the rudder in response to manually-operated levers at the pilot position. The radiator and the engine inclosure shutters may also be operated in a similar manner.

It will be understood that I desire to comprehend within my invention such modifications as come within the scope of the claim and the invention.

Having thus fully described my invention, what I claim as new and desire to secure by Letters Patent, is:

A remote control system comprising transmitting and receiving positions, a circuit including a source of electromotive force at the transmitting position, a rotary switch for making and breaking said circuit and for transmitting to the receiving position impulses in synchronism with the rotation of the switch, said switch having rotatable and stationary members, said stationary members including a ring and a plurality of spring pressed radially movable contacts equidistantly spaced around said ring, each of said members being provided with equi-distantly spaced terminals which are adapted to contact one another, the number of terminals on the rotatable member being different from the number of terminals on the stationary member whereby the terminals contact in sequence as the rotatable member is rotated, a plurality of electromagnets at the receiving position, said electromagnets being connected respectively to said stationary contact members at the transmitting position, a multi-pole rotor rotatably mounted with respect to said electromagnets, the number of electromagnets and the number of terminals on said stationary member being the same, and the number of poles of said rotor and the terminals of the rotatable member both being of a different number than the number of said electromagnets, and a source of electromotive force at the transmitting position for energizing said rotary switch whereby current impulses are transmitted to the electromagnets in a sequence depending on the direction of rotation of the rotary switch at the transmitting station and whereby the rotor at the receiving station is caused to rotate.

EDWARD M. SORENSEN.